(12) United States Patent
Nedovic

(10) Patent No.: US 9,793,805 B2
(45) Date of Patent: Oct. 17, 2017

(54) CHARGE PUMP CURRENT ADJUSTMENT

(71) Applicant: FUJITSU LIMITED, Kawasaki-shi, Kanagawa (JP)

(72) Inventor: Nikola Nedovic, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 14/674,385

(22) Filed: Mar. 31, 2015

(65) Prior Publication Data

US 2016/0294283 A1    Oct. 6, 2016

(51) Int. Cl.
*H02M 3/158* (2006.01)
*H02M 1/08* (2006.01)
*H02M 3/07* (2006.01)
*H02M 1/00* (2006.01)

(52) U.S. Cl.
CPC ............ *H02M 3/158* (2013.01); *H02M 1/08* (2013.01); *H02M 3/1588* (2013.01); *H02M 3/07* (2013.01); *H02M 2001/0003* (2013.01)

(58) Field of Classification Search
CPC ...... H02M 3/1588; H02M 3/158; H02M 3/07; H02M 2001/0003; H02M 1/08
USPC ................................ 323/268, 270, 273, 274
See application file for complete search history.

(56) References Cited

U.S. PATENT DOCUMENTS

| | | | | |
|---|---|---|---|---|
| 5,841,321 A | * | 11/1998 | Miyake | G11B 5/5526 330/255 |
| 5,909,146 A | * | 6/1999 | Okada | H03F 3/4521 330/255 |
| 5,990,742 A | * | 11/1999 | Suzuki | H03F 3/3001 330/253 |
| 6,359,796 B2 | * | 3/2002 | Hartular | H02M 3/1584 361/111 |
| 6,377,033 B2 | * | 4/2002 | Hsu | H02M 3/1588 323/224 |
| 7,385,429 B1 | | 6/2008 | Mei et al. | |
| 7,737,784 B2 | * | 6/2010 | Boucher | H03F 3/3022 330/264 |
| 7,902,888 B1 | | 3/2011 | Mei et al. | |
| 9,035,625 B2 | * | 5/2015 | Burns | H02M 3/1588 323/224 |

(Continued)

FOREIGN PATENT DOCUMENTS

CN    102075085 B    5/2011

OTHER PUBLICATIONS

E. Juárez-Hernández et al., "Novel CMOS Charge-Pump Circuit With Positive Feedback for PLL Applications" 2001.

(Continued)

*Primary Examiner* — Kyle J Moody
(74) *Attorney, Agent, or Firm* — Maschoff Brennan

(57) ABSTRACT

A charge pump circuit may include an output node, a current source circuit, a current sink circuit, a first amplifier circuit, and a second amplifier circuit. The current source circuit may be configured to source current to the output node. The current sink circuit may be configured to sink current from the output node. The first amplifier circuit may be configured to adjust a first amount of current sourced by the current source circuit based on a voltage on the output node. The second amplifier circuit may be configured to adjust the first amount of current sourced by the current source circuit or a second amount of current sunk by the current sink circuit based on the voltage on the output node.

14 Claims, 7 Drawing Sheets

(56) References Cited

U.S. PATENT DOCUMENTS

| | | | | |
|---|---|---|---|---|
| 9,154,026 B2* | 10/2015 | Schrom | ............... | H02M 1/08 |
| 2008/0088283 A1* | 4/2008 | Ruobiao | ............ | H02M 3/1588 |
| | | | | 323/271 |
| 2009/0153119 A1* | 6/2009 | Trochut | ............ | H02M 3/1588 |
| | | | | 323/282 |
| 2009/0322300 A1* | 12/2009 | Melanson | .......... | H02M 3/1563 |
| | | | | 323/284 |
| 2010/0164457 A1* | 7/2010 | Al-Shyoukh | ........ | H03F 3/2173 |
| | | | | 323/284 |
| 2011/0025283 A1* | 2/2011 | Futamura | ........... | H02M 3/1588 |
| | | | | 323/282 |
| 2011/0260703 A1* | 10/2011 | Laur | .................. | H02M 3/1563 |
| | | | | 323/271 |
| 2013/0134953 A1* | 5/2013 | Shi | ..................... | H02M 3/1584 |
| | | | | 323/282 |
| 2014/0070781 A1* | 3/2014 | Yanagida | ................. | G05F 1/10 |
| | | | | 323/271 |
| 2016/0111956 A1* | 4/2016 | Childs | .................. | H02M 3/156 |
| | | | | 323/271 |
| 2016/0139620 A1* | 5/2016 | Landolt | ................... | G05F 3/16 |
| | | | | 327/108 |

OTHER PUBLICATIONS

A., Tsitouras et al., "A 1 V CMOS programmable accurate charge pump with wide output voltage range"Microelectronics Journal, vol. 42, Issue 9, Sep. 2011, pp. 1082-1089.

J. Lee et al., "Charge pump with perfect current matching characteristics in phase-locked loops" Electronics Letters (vol. 36 , Issue: 23, Nov. 9, 2000).

\* cited by examiner

CHARGE PUMP CURRENT ADJUSTMENT

FIELD

The embodiments discussed herein are related to charge pump current adjustments.

BACKGROUND

Many circuits today use charge pumps that may operate as bipolar switched current sources. For example, charge pumps may be used in analog and/or digital/analog phase-locked loops (PLL). PLLs typically are highly sensitive, such that minor changes in the behavior of a charge pump in the PLL may result in the PLL not functioning correctly. For example, charge pumps in PLLs that demonstrate current mismatches between up and down current pulses may result in non-zero static-phase error in the PLLs and/or the inability of the PLLs to lock to a signal. The current mismatches in a charge pump may result from the output impedance of the charge pump being reduced due to higher operating speeds of the charge pump and/or reduced supply voltage levels of the charge pump.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a charge pump circuit may include an output node, a current source circuit, a current sink circuit, a first amplifier circuit, and a second amplifier circuit. The current source circuit may be configured to source current to the output node. The current sink circuit may be configured to sink current from the output node. The first amplifier circuit may be configured to adjust a first amount of current sourced by the current source circuit based on a voltage on the output node. The second amplifier circuit may be configured to adjust the first amount of current sourced by the current source circuit or a second amount of current sunk by the current sink circuit based on the voltage on the output node.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

According to an aspect of an embodiment, a charge pump circuit is disclosed that adjusts the current sourced to and sunk from an output node to compensate for the finite output impedance of the charge pump circuit. In general, charge pump circuits that operate at high speeds, e.g., speeds above 1 gigahertz (GHz) and/or at low voltages, e.g., voltages below 1 volt, may have lower output impedances. As a result, the current sourced to or sunk from an output node may be dependent on a voltage on the output node. As a result, the current sourced and the current sunk may be different. The charge pump circuits disclosed herein may adjust the currents sourced and/or sunk based on the voltage on the output node to compensate for the difference between the sourced and sunk current. In some embodiments, an example charge pump circuit may include two amplifiers configured to adjust the currents sourced or sunk.

Embodiments of the present disclosure will be explained with reference to the accompanying drawings.

Figure 1:
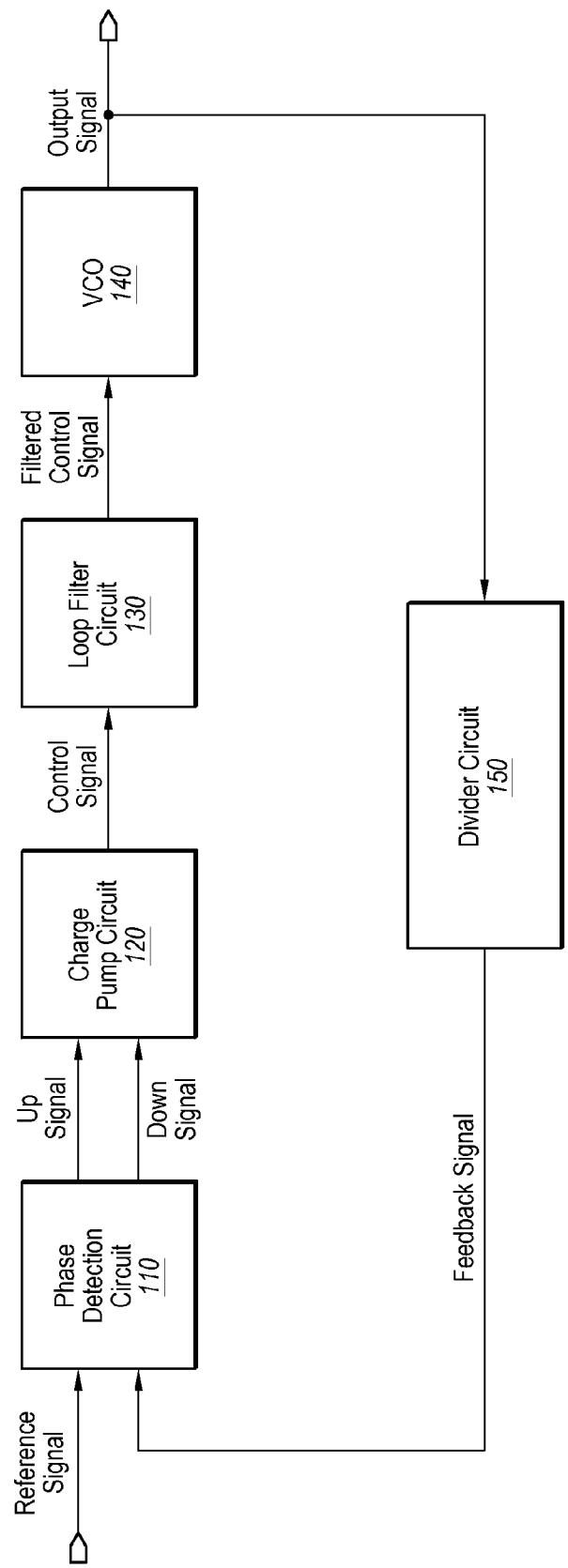
FIG. 1 is a diagram of an example phase-locked loop circuit.

FIG. 1 is a diagram of an example phase-locked loop circuit 100 ("the circuit 100"), arranged in accordance with at least one embodiment described herein. The circuit 100 may include a phase detection circuit 110, a charge pump circuit 120, a loop filter circuit 130, a voltage controlled oscillator circuit ("VCO") 140, and a divider circuit 150. In some embodiments, the circuit 100 may be used to lock a frequency and phase of an output signal to a frequency and phase of a reference signal or a multiple of the frequency and phase of the reference signal.

In some embodiments, the phase detection circuit 110 may be configured to compare the phase of the reference signal with the feedback signal. The feedback signal may be generated based on the output signal. In some embodiments, the feedback signal may be the output signal. Alternately or additionally, the output signal may be a multiple of the feedback signal based on the divisor of the divider circuit 150.

The phase detection circuit 110 may be configured to generate up and down signals and to provide the up and down signals to the charge pump circuit 120. The up and down signals may act as control signals for the circuit 100. For example, the up and down signals may be used to adjust a phase and/or frequency of the output signal and thus the feedback signal so that it locks, e.g., matches, the phase and/or frequency of the reference signal.

The state of the up and down signals may depend on whether the phase of the feedback signal is leading (needs to slow down) or lagging (needs to speed up) the phase of the reference signal. For example, in some embodiments, when the phase of the feedback signal is lagging the phase of the reference signal, the up and down signals may be in a first state. For example, the up signal and the down signal may both be logical zeroes, e.g., may have a voltage level that is below a logical zero threshold for transistors in the charge pump circuit 120. Alternately or additionally, in some embodiments, when the phase of the feedback signal is leading the phase of the reference signal, the up and down signals may be in a second state. For example, the up signal and the down signal may both be logical ones, e.g., may have a voltage level that is above a logical one threshold for transistors in the charge pump circuit 120.

The charge pump circuit 120 may receive the up and down signals and may generate current pulses on its output based on the up and down signals. The current pulses may result in a control signal that is provided to the loop filter circuit 130. For example, when the up and down signals are in a first state, the charge pump circuit 120 may generate a current pulse that sources current to its output. In contrast, when the up and down signals are in a second state, the charge pump circuit 120 may generate a current pulse that sinks current from its output.

Sourcing and sinking current from its output may change the voltage of the control signal that is provided to the loop filter circuit 130. When the feedback signal is locked with the reference signal, the up and down signals may alternate between the first and second states in a manner such that over time an amount of current sourced and sunk by the charge pump circuit 120 is equal or approximately equal such that the voltage of the control signal maintains approximately equal. Alternately, when the feedback signal is not locked with the reference signal, the up and down signals may alternate between the first and second states in a manner such that over time more current may be sourced and sunk by the charge pump circuit 120 to adjust the voltage of the control signal. Adjusting the voltage of the control signal may result in the frequency and/or phase of the feedback signal being adjusted.

In some embodiments, the charge pump circuit 120 may be configured to compensate for differences in an amount of current sourced or sunk during a current pulse. For example, due to finite output impedance at the output of the charge pump circuit 120, an amount of current sourced or sunk during a current pulse may be dependent on a voltage level of the control signal. In particular, charge pumps that operate at speeds above 1 gigahertz (GHz), and in particular above 10 GHz, and/or at low voltages, e.g., voltages below 1 volt, may have lower output impedances. Thus, even when the phases of the reference signal and the feedback signal are equal or approximately equal and the charge pump circuit 120 is generating an equal amount of sourcing and sinking current pulses, because an amount of current of the sourcing and sinking current pulses are not equal, the voltage of the control signal may change. The change in the voltage of the control signal may result in static phase error or the inability of the circuit 100 to lock the feedback signal to the reference signal.

To compensate for the differences in the amount of current sourced or sunk during a current pulse, the charge pump circuit 120 may adjust the current sources sourcing or sinking the current based on the voltage level of the control signal. Further description of how the current sources are adjusted is provided hereafter.

The control signal may be provided to the loop filter circuit 130. The loop filter circuit 130 may filter the control signal and may provide the filtered control signal to the VCO 140. The VCO may generate the output signal with a frequency and/or phase that may be proportional to the voltage of the filtered control signal. The divider circuit 150 may divide the output signal to generate the feedback signal that may be feedback to the phase detection circuit 110. As a result, the frequency of the output signal may be a multiple of the frequency of the reference signal.

Modifications, additions, or omissions may be made to the circuit 100 without departing from the scope of the present disclosure. For example, in some embodiments, the circuit 100 may include additional passive or active circuit components. As another example, the circuit 100 may not include the divider circuit 150.

Figure 2A:
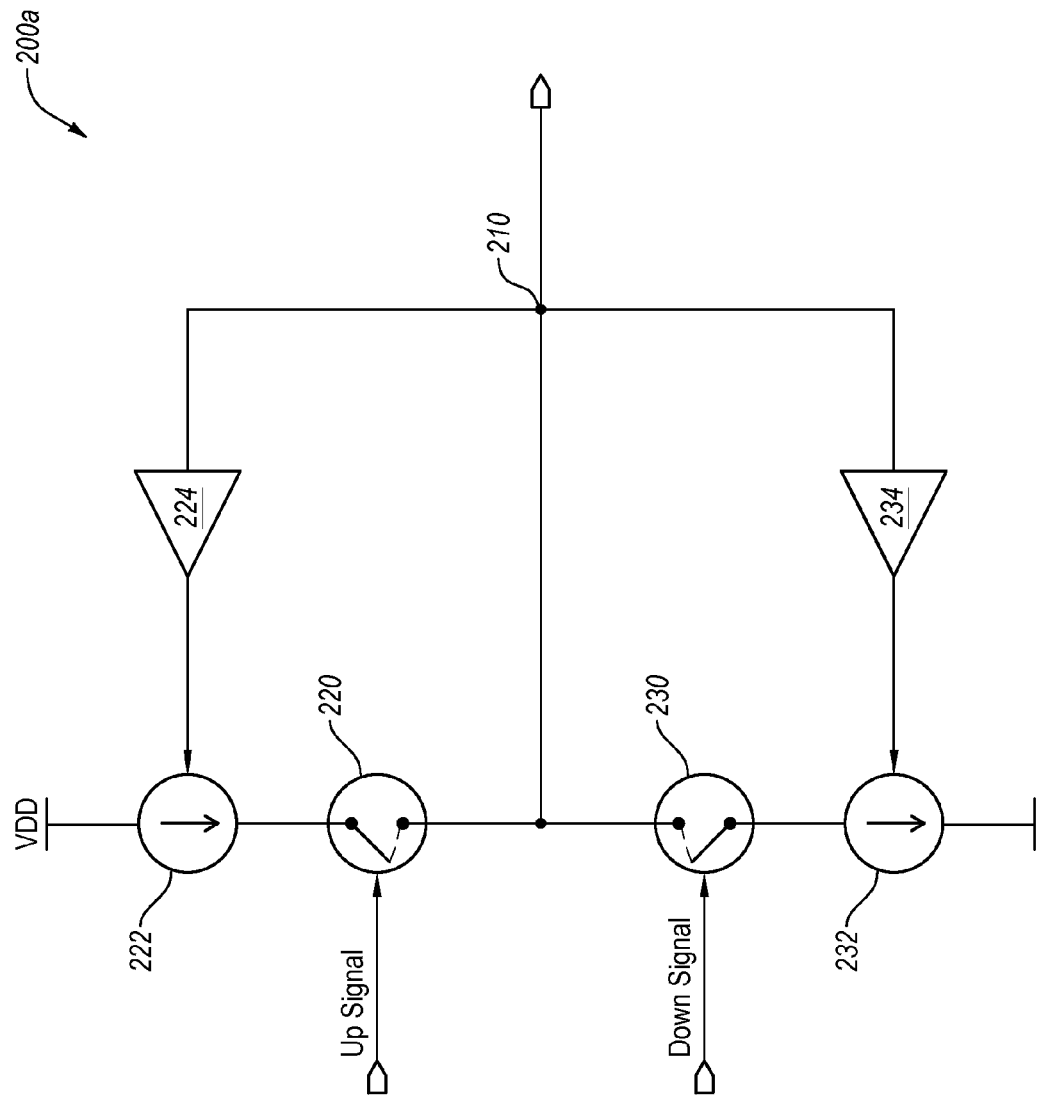
FIG. 2a is a diagram of an example charge pump circuit.

FIG. 2a is a diagram of an example charge pump circuit 200a ("the circuit 200a"), arranged in accordance with at least one embodiment described herein. The circuit 200a may include an output node 210, a first switch circuit 220, a current source circuit 222, a first amplifier circuit 224, a second switch circuit 230, a current sink circuit 232, and a second amplifier circuit 234.

The first switch circuit 220 may be configured to selectively electrically couple the current source circuit 222 with the output node 210. The first switch circuit 220 may electrically couple and/or decouple the current source circuit 222 and the output node 210 based on an up signal. In some embodiments, the up signal may be received from a phase detection circuit, such as the phase detection circuit 110 of FIG. 1. When the up signal is in a first state, the up signal may direct and/or cause the first switch circuit 220 to electrically couple the current source circuit 222 and the output node 210 such that the current source circuit 222 may source current to the output node 210. When the up signal is in a second state, the up signal may direct and/or cause the first switch circuit 220 to electrically decouple the current source circuit 222 and the output node 210, such that the current source circuit 222 may not source current to the output node 210.

The second switch circuit 230 may be configured to selectively electrically couple the current sink circuit 232 with the output node 210. The second switch circuit 230 may electrically couple and/or decouple the current sink circuit 232 and the output node 210 based on a down signal. In some embodiments, the down signal may be received from a phase detection circuit, such as the phase detection circuit 110 of FIG. 1. When the down signal is in a first state, the down signal may direct and/or cause the second switch circuit 230 to electrically decouple the current sink circuit 232 and the output node 210, such that the current sink circuit 232 may not sink current from the output node 210. When the down signal is in a second state, the down signal may direct and/or cause the second switch circuit 230 to electrically couple the current sink circuit 232 and the output node 210 such that the current sink circuit 232 may sink current from the output node 210.

In some embodiments, the up and down signals may be configured such that one of the first and second switch circuits 220 and 230 are electrically coupling one of the current source and sink circuits 222 and 232 with the output node 210. For example, in a first state, the first switch circuit 220 may electrically couple the current source circuit 222 and the output node 210 and the second switch circuit 230 may electrically decouple the current sink circuit 232 and the output node 210. In a second state, the first switch circuit 220 may electrically decouple the current source circuit 222 and the output node 210 and the second switch circuit 230 may electrically couple the current sink circuit 232 and the output node 210.

The current source circuit 222 may be configured to source current to the output node 210. In particular, the current source circuit 222 may be configured to source a first amount of current to the output node 210 assuming an infinite output impedance of the current source circuit 222.

The current sink circuit 232 may be configured to sink current from the output node 210. In particular, the current sink circuit 232 may be configured to sink the first amount of current from the output node 210 assuming an infinite output impedance of the current source circuit 222.

Because the current source and sink circuits 222 and 232 both include finite output impedances, in some embodiments, the currents source or sunk may not be equal or approximately equal to the first amount. Accordingly, the source and sink currents may be different. The first and second amplifier circuits 224 and 234 may be configured to adjust the current source and sink circuits 222 and 232, respectively, to adjust the currents sourced or sunk by the current source and sink circuits 222 and 232. The currents sourced or sunk by the current source and sink circuits 222 and 232 may be adjusted to bring the amount of current sourced and the amount of current sunk to be closer to being equal or to be equal for an equal number of up and down signals received by the circuit 200a.

For example, the first amplifier circuit 224 may be configured to adjust the current sourced by the current source circuit 222 based on a voltage level on the output node 210. For example, in some embodiments the voltage level may be compared to a source threshold voltage. In some embodiments, the source threshold voltage may be based on a voltage swing on the output of the circuit 200a. Alternately or additionally, the source threshold voltage may be based on operating voltages and parameters of the first amplifier circuit 224. For example, when the first amplifier circuit 224 is one or more active devices, such as transistors, the source threshold voltage may be based on the threshold voltages of the transistors, the voltage levels for the different regions of operation of the transistors, and/or the configuration of the transistors in the circuit 200a. In particular, when the first amplifier circuit 224 is a transistor, the source threshold voltage may be a supply voltage of the transistor minus the threshold voltage of the transistor.

When the voltage level on the output node 210 is below a source threshold voltage, the first amplifier circuit 224 may be configured to cause the current source circuit 222 to reduce an amount of the current sourced to the output node 210. In some embodiments, an amount of the current reduction may be proportional to an amount that the voltage level is below the source threshold voltage of the output node 210. For example, when the voltage level is farther from the source threshold voltage, the reduction in current may be higher than when the voltage level is nearer to the source threshold voltage.

Alternately or additionally, when the voltage level on the output node 210 is above a source threshold voltage, the first amplifier circuit 224 may be configured to cause the current source circuit 222 to increase an amount of the current sourced to the output node 210. In some embodiments, an amount of the current increase may be proportional to an amount that the voltage level is above the source threshold voltage.

The second amplifier circuit 234 may be configured to adjust the current sunk by the current sink circuit 232 based on a voltage level on the output node 210. For example, when the voltage level on the output node 210 is above sink threshold voltage, the second amplifier circuit 234 may be configured to cause the current sink circuit 232 to reduce an amount of the current sunk from the output node 210. In some embodiments, an amount of the current reduction may be proportional to an amount that the voltage level is above the sink threshold voltage.

Alternately or additionally, when the voltage level on the output node 210 is below the sink threshold voltage, the second amplifier circuit 234 may be configured to cause the current sink circuit 232 to increase an amount of the current sunk from the output node 210. In some embodiments, an amount of the current increase may be proportional to an amount that the voltage level is below the sink threshold voltage.

In some embodiments, the sink threshold voltage may be based on a voltage swing on the output of the circuit 200a. Alternately or additionally, the sink threshold voltage may be based on operating voltages and parameters of the second amplifier circuit 234. For example, when the second amplifier circuit 234 is one or more active devices, such as transistors, the sink threshold voltage may be based on the threshold voltages of the transistors, the voltage levels for the different regions of operation of the transistors, and/or the configuration of the transistors in the circuit 200a.

The reduction and/or increase in the currents sunk and sourced by the current source and sink circuits 222 and 232 may counter changes in the currents from the first amount due to the finite output impedances of the current source and sink circuits 222 and 232.

In some embodiments, the first amplifier circuit 224 may have a range of operation with respect to voltages on the output node 210. For example, the first amplifier circuit 224 may operate to adjust current sourced by the current source circuit 222 when the voltages on the output node 210 are within a particular range. When the voltage on the output node 210 is outside the range of operation of the first amplifier circuit 224, the first amplifier circuit 224 may not adjust the current sourced by the current source circuit 222. In some embodiments, the first amplifier circuit 224 may have a first range of operation that is smaller than the ranges of voltage that may occur on the output node 210. For example, assume that the voltages on the output node 210 may range between 0.0 and 1.0 volt. The first range of operation of the first amplifier circuit 224 may be between 0.0 and 0.7 volt. Thus, when the voltage on the output node 210 is between 0.0 and 0.7 volt, the first amplifier circuit 224 may cause the current source circuit 222 to adjust the current sourced to the output node 210. When the voltage on the output node 210 is between 0.7 and 1.0 volt, the first amplifier circuit 224 may not cause the current source circuit 222 to adjust the current sourced to the output node 210.

In some embodiments, the second amplifier circuit 234 may also have a range of operation with respect to the range of voltages on the output node 210. In particular, the second amplifier circuit 234 may have a second range of operation that is smaller than the range of voltages on the output node 210.

In some embodiments, the first range of operation of the first amplifier circuit 224 may overlap with the second range of operation of the second amplifier circuit 234. In these and other embodiments, some of the voltages in the first range of operation of the first amplifier circuit 224 may be lower than the voltages in the second range of operation of the second amplifier circuit 234. For example, the first range of operation may be 0.0 to 0.7 volt and the second range of operation may be 0.4 to 1.0 volt when the voltage range of the output node 210 is between 0.0 and 1.0 volt. In these and other embodiments, the voltage range of the output node 210 may be based on the supply voltage of the circuit 200a. For example, the upper voltage range of the output node 210 may be based on or approximately equal to the supply voltage of the circuit 200a.

As described herein, the circuit 200a may thus use the first and second amplifier circuits 224 and 234 to reduce a difference between the current sourced to and sunk from the output node 210 for an equal number of up and down signals. By reducing the difference between the current sourced to and sunk from the output node 210, the circuit 200a may reduce static phase error in a PLL in which the circuit 200a may be used.

Modifications, additions, or omissions may be made to the circuit 200a without departing from the scope of the present disclosure. For example, in some embodiments, the circuit 200a may include other passive and/or active circuit elements. Alternately or additionally, the gains of the first and second amplifier circuits 224 and 234 may be adjustable or fixed.

Figure 2B:
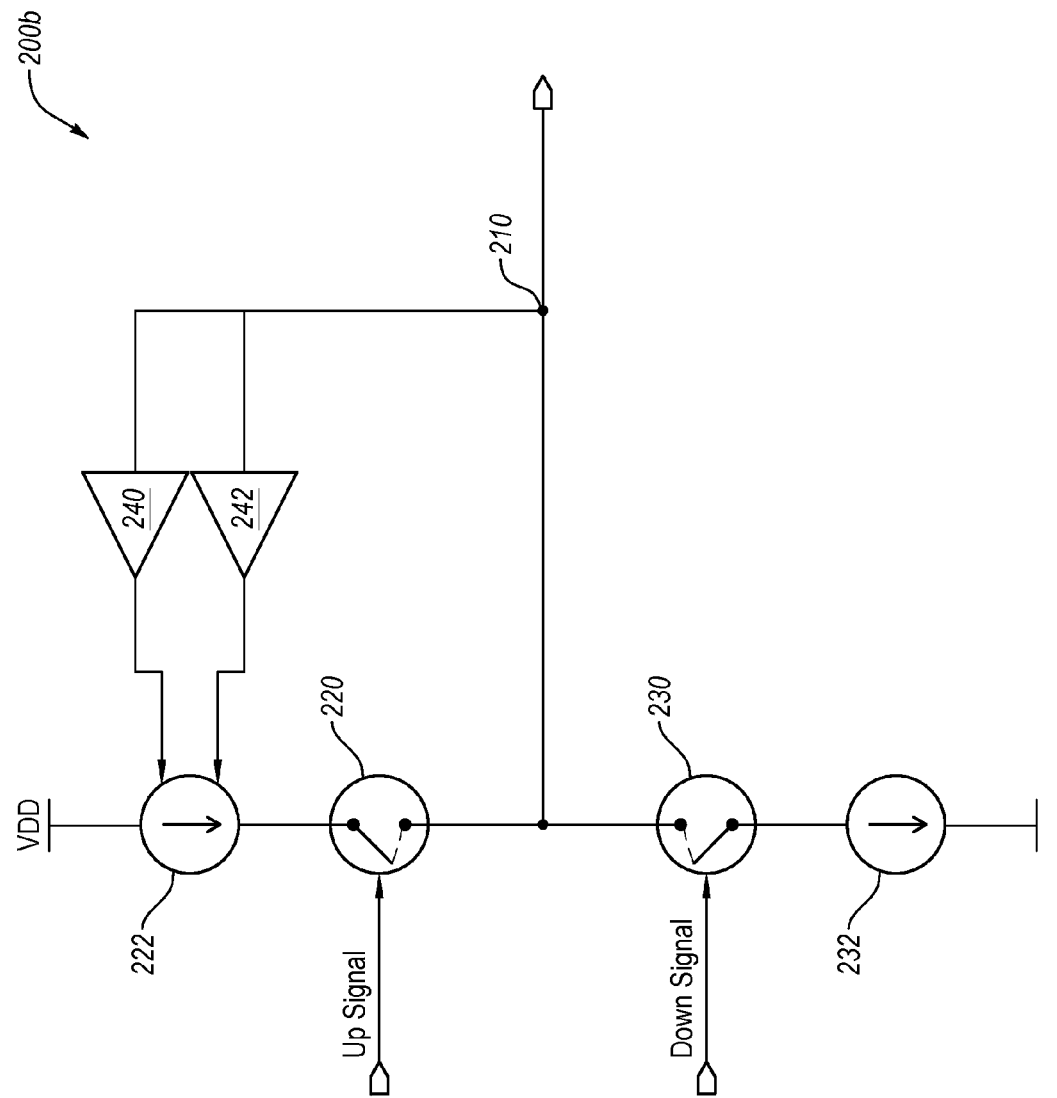
FIG. 2b is a diagram of another example charge pump circuit.

FIG. 2b is a diagram of an example charge pump circuit 200b ("the circuit 200b"), arranged in accordance with at least one embodiment described herein. The circuit 200b may include the output node 210, the first switch circuit 220, the current source circuit 222, the second switch circuit 230, and the current sink circuit 232 from FIG. 2a, except that the current sunk by the current sink circuit 232 may not be adjusted.

The circuit 200b further includes first and second amplifier circuits 240 and 242. Both the first and second amplifier circuits 240 and 242 may be configured to adjust the current sourced by the current source circuit 222 based on the voltage level on the output node 210. In these and other embodiments, the first and second amplifier circuits 240 and 242 may have different ranges of operations. The first amplifier circuit 240 may have a first range of operation and the second amplifier circuit 242 may have a second range of operation. Both the first and second ranges of operation individually may not cover the range of voltages on the output node 210. However, the first and second ranges may overlap and be configured such that the current source circuit 222 may be adjusted for all of or a majority of the voltages on the output node 210.

For example, when the voltage on the output node is below a threshold voltage, e.g., a medium voltage of the output node 210, the first amplifier circuit 240 may be configured to cause or direct the current source circuit 222 to reduce the current sourced to the output node 210. Alternately or additionally, when the voltage on the output node 210 is above or at the threshold voltage, the second amplifier circuit 242 may be configured to cause or direct the current source circuit 222 to increase the current sourced to the output node 210. Using the first and second amplifier circuits 240 and 242, the circuit 200b may reduce a difference between the current sourced to and sunk from the output node 210 for an equal number of up and down signals.

Modifications, additions, or omissions may be made to the circuit 200b without departing from the scope of the present disclosure. For example, in some embodiments, the circuit 200b may include other passive and/or active circuit elements. Alternately or additionally, the gains of the first and second amplifier circuits 240 and 242 may be adjustable or fixed.

Figure 3:
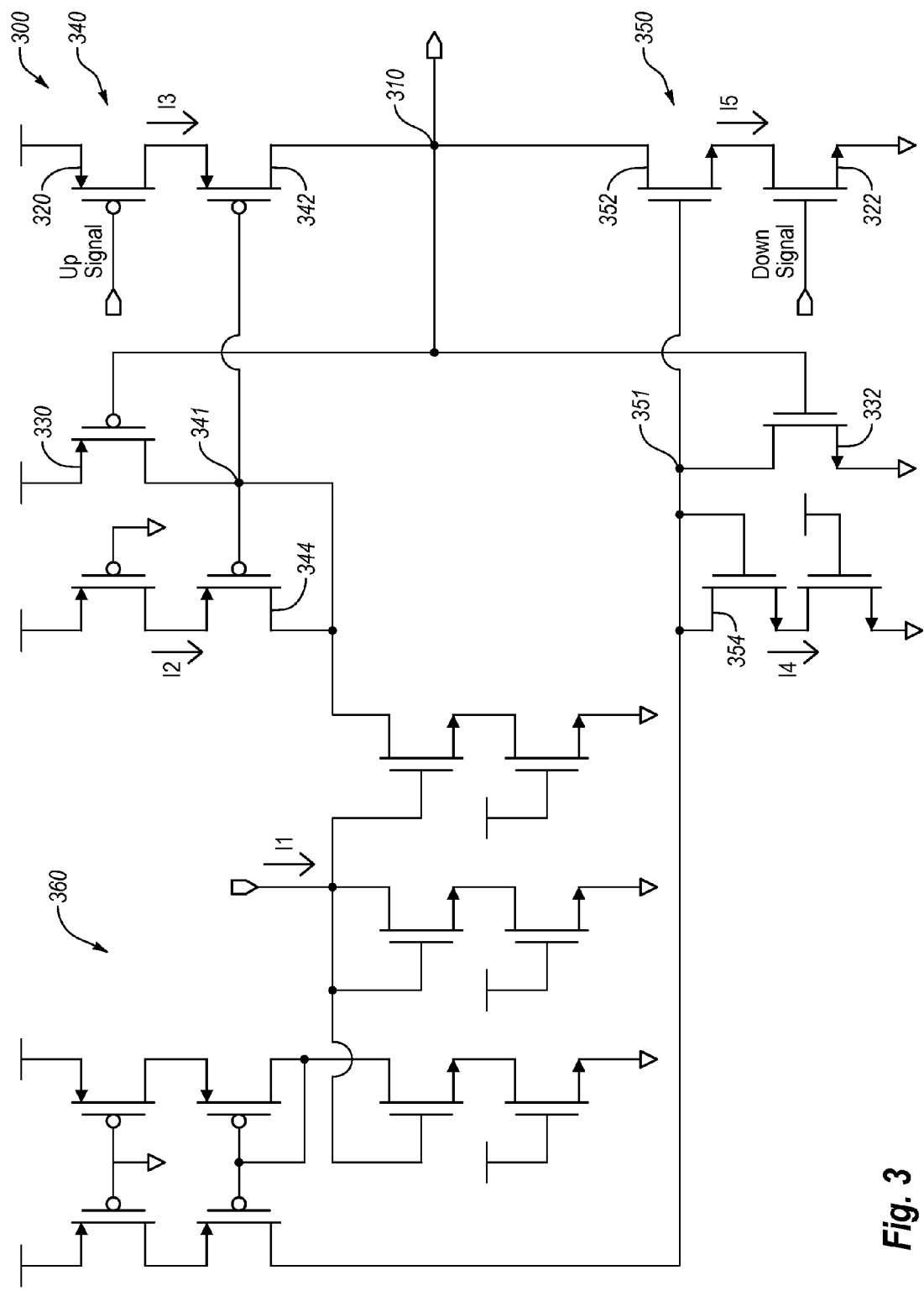
FIG. 3 is a diagram of another example charge pump circuit.

FIG. 3 is a diagram of an example charge pump circuit 300 ("the circuit 300"), arranged in accordance with at least one embodiment described herein. The circuit 300 may include an output node 310, a first switch transistor 320, a second switch transistor 322, a first amplifier transistor 330, a second amplifier transistor 332, a current source circuit 340, a current sink circuit 350, and a current supply circuit 360. In some embodiments, the circuit 300 may be an example transistor level configuration of the diagram illustrated in FIG. 2a.

The circuit 300 includes various transistors. Each of the transistors may include a gate terminal, a source terminal, and a drain terminal. As illustrated in FIG. 3, the source terminal may be the terminal with the arrow, the gate terminal may be the terminal with the parallel horizontal lines, and the drain terminal may be the other terminal.

The current source circuit 340 may include source transistors 342 and 344 and may be configured to source current I3 to the output node 310. The current sink circuit 350 may include sink transistors 352 and 354 and may be configured to sink current I5 from the output node 310.

The first switch transistor 320 may include a gate terminal coupled to an up signal, a source terminal coupled to a voltage supply, and a drain terminal coupled to the source transistor 342. The up signal may be provided by a phase detection circuit, such as the phase detection circuit 110 of FIG. 1. When the up signal is in a first state, e.g., a logical zero, the first switch transistor 320 may conduct and pass current I3 from the supply voltage to the output node 310 through the source transistor 342. An amount of the current I3 sourced to the output node 310 may be adjusted by the source transistor 342 as explained hereafter. When the up signal is in a second state, e.g., a logical one, the first switch transistor 320 may not conduct. As a result, the current I3 may not be sourced to the output node 310 from the supply voltage.

The second switch transistor 322 may include a gate terminal coupled to a down signal, a source terminal coupled to ground, and a drain terminal coupled to the sink transistor 352. The down signal may be provided by a phase detection circuit, such as the phase detection circuit 110 of FIG. 1. When the down signal is in a first state, e.g., a logical zero, the second switch transistor 322 may not conduct. As a result, current I5 may not be sunk from the output node 310 to ground. When the down signal is in a second state, e.g., a logical one, the second switch transistor 322 may conduct and pass the current I5 from the output node 310 to ground through the sink transistor 352. An amount of the current I5 sunk from the output node 310 may be adjusted by the sink transistor 352 as explained hereafter.

The up and down signals may be configured such that one of the first and second switch transistors 320 and 322 are conducting at a given time. As a result, the current source circuit 340 and the current sink circuit 350 may not be sourcing and sinking current at the same time.

The first amplifier transistor 330 may include a gate terminal coupled to the output node 310, a source terminal coupled to a voltage supply, and a drain terminal coupled to a node 341. The node 341 may also be coupled to gate terminals of the source transistors 342 and 344. Based on the voltage level on the output node 310, the first amplifier transistor 330 may conduct current between its source and drain terminal. The amount of conduction of the first amplifier transistor 330 may vary based on the voltage level on the output node 310.

The first amplifier transistor 330 may conduct when the voltage on the output node 310 is lower than a threshold cutoff voltage of the first amplifier transistor 330 and may not conduct when the voltage on the output node 310 is higher than the threshold cutoff voltage. The conduction of the first amplifier transistor 330 may change the voltage on the node 341. For example, when the first amplifier transistor 330 conducts, the voltage on the node 341 may increase and when the first amplifier transistor 330 does not conduct, the voltage on the node 341 may decrease. Thus, the voltage on the node 341 may have an inverse type relationship to the voltage on the output node 310.

The current source circuit 340 may be configured to source the current I3 to the output node 310. The current I3 may be based on a current I1 from the current supply circuit 360 and a current adjustment by the first amplifier transistor 330. For example, the current supply circuit 360 may be supplied the current I1. The current supply circuit 360 may be configured such that a current mirror exists between the current supply circuit 360 and the current source circuit 340. Thus, when the first amplifier transistor 330 does not adjust the voltage on the node 341, a current I2 that passes through the source transistor 344 may be equal or proportional to the current I1 supplied to the current supply circuit 360. The current I2 may be equal to the current I1 when the source transistor 344 is configured to have similar widths as the transistors in the current supply circuit 360 and proportional when the source transistor 342 is configured to have proportional widths as the transistors in the current supply circuit 360.

The source transistor 344 and the source transistor 342 may also be configured in a current mirror configuration. As a result, the current I3 that is sourced to the output node 310 may be equal or proportional to the current I2. Thus, when the first amplifier transistor 330 does not adjust the voltage on the node 341, the current I1 and the current I3 may be equal or proportional assuming infinite output impedance of the current source circuit 340.

When the first amplifier transistor 330 does adjust the voltage on the node 341, the voltage on the node 341 adjusts an amount of the current I2 that the source transistor 344 conducts. Because of the current mirror between the source transistor 344 and the source transistor 342, the voltage on the node 341 may also adjust an amount of the current I3 that is sourced to the output node 310. In this manner, the first amplifier transistor 330 may adjust the current sourced to the output node 310 by the current source circuit 340.

The second amplifier transistor 332 may conduct when the voltage on the output node 310 is higher than a threshold cutoff voltage of the second amplifier transistor 332 and may not conduct when the voltage on the output node 310 is lower than the threshold cutoff voltage. The conduction of the second amplifier transistor 332 may change the voltage on a node 351. For example, when the second amplifier transistor 332 conducts, the voltage on the node 351 may decrease and when the second amplifier transistor 332 does not conduct, the voltage on the node 351 may increase. Thus, the voltage on the node 351 may have a non-inverse relationship to the voltage on the output node 310.

The current sink circuit 350 may be configured to sink the current I5 from the output node 310. The current I5 may be based on the current I1 supplied to the current supply circuit 360 and a current adjustment by the second amplifier transistor 332. For example, the current supply circuit 360 may be configured such that a current mirror exists between the current supply circuit 360 and the current sink circuit 350. Thus, when the second amplifier transistor 332 does not adjust the voltage on the node 351, a current I4 that passes through the sink transistor 354 may be equal or proportional to the current I1 supplied to the current supply circuit 360.

The sink transistors 352 and 354 may also be configured in a current mirror configuration. As a result, the current I5 that is sunk from the output node 310 may be equal or proportional to the current I4. Thus, when the second amplifier transistor 332 does not adjust the voltage on the node 351, the current I1 and the current I5 may be equal or proportional. Likewise, when the second amplifier transistor 332 does not adjust the voltage on the node 351 and when the first amplifier transistor 330 does not adjust the voltage on the node 341, the currents I3 and I5 may be equal, assuming infinite output impedance of the current source circuit 340 and the current sink circuit 350.

When the second amplifier transistor 332 does adjust the voltage on the node 351, the voltage on the node 351 may adjust an amount of the current I4 that the sink transistor 354 conducts. Because of the current mirror between the sink transistors 352 and 354, the voltage on the node 351 may also adjust an amount of the current I5 that is sunk from the output node 310. In this manner, the second amplifier transistor 332 may adjust the current sunk from the output node 310 by the current sink circuit 350.

A brief description of the operation of the circuit 300 follows. When the voltage on the output node 310 is low, such as below a threshold cutoff voltage of the first amplifier transistor 330, the first amplifier transistor 330 may increase the voltage on the node 341 such that the current I3 sourced to the output node 310 may be reduced. Reducing the current I3 sourced to the output node 310 when the voltage on the output node 310 is low may counter increases in the current I3 due to the finite output impedance of the current source circuit 340.

In an analogous manner, when the voltage on the output node 310 is high, such as above a threshold cutoff voltage of the second amplifier transistor 332, the second amplifier transistor 332 may decrease the voltage on the node 351 such that the current I5 sunk from the output node 310 may be reduced. Reducing the current I5 sunk from the output node 310 when the voltage is high may counter increases in the current I5 due to the finite output impedance of the current source circuit 340. In this manner, the circuit 300 may operate to adjust the currents sourced and sunk to the output node 310 to more closely maintain the currents sourced and sunk at the same level for an equal number of up and down signals received by the circuit 300.

Modifications, additions, or omissions may be made to the circuit 300 without departing from the scope of the present disclosure. For example, in some embodiments, the circuit 300 may include one or more passive and/or active circuit components. Alternately or additionally, the gains of the first and second amplifier transistors 330 and 332 may be adjustable or fixed. Alternately or alternatively, the current I1 may be adjusted to adjust the currents sourced to and/or sunk from the output node 310.

Figure 4A:
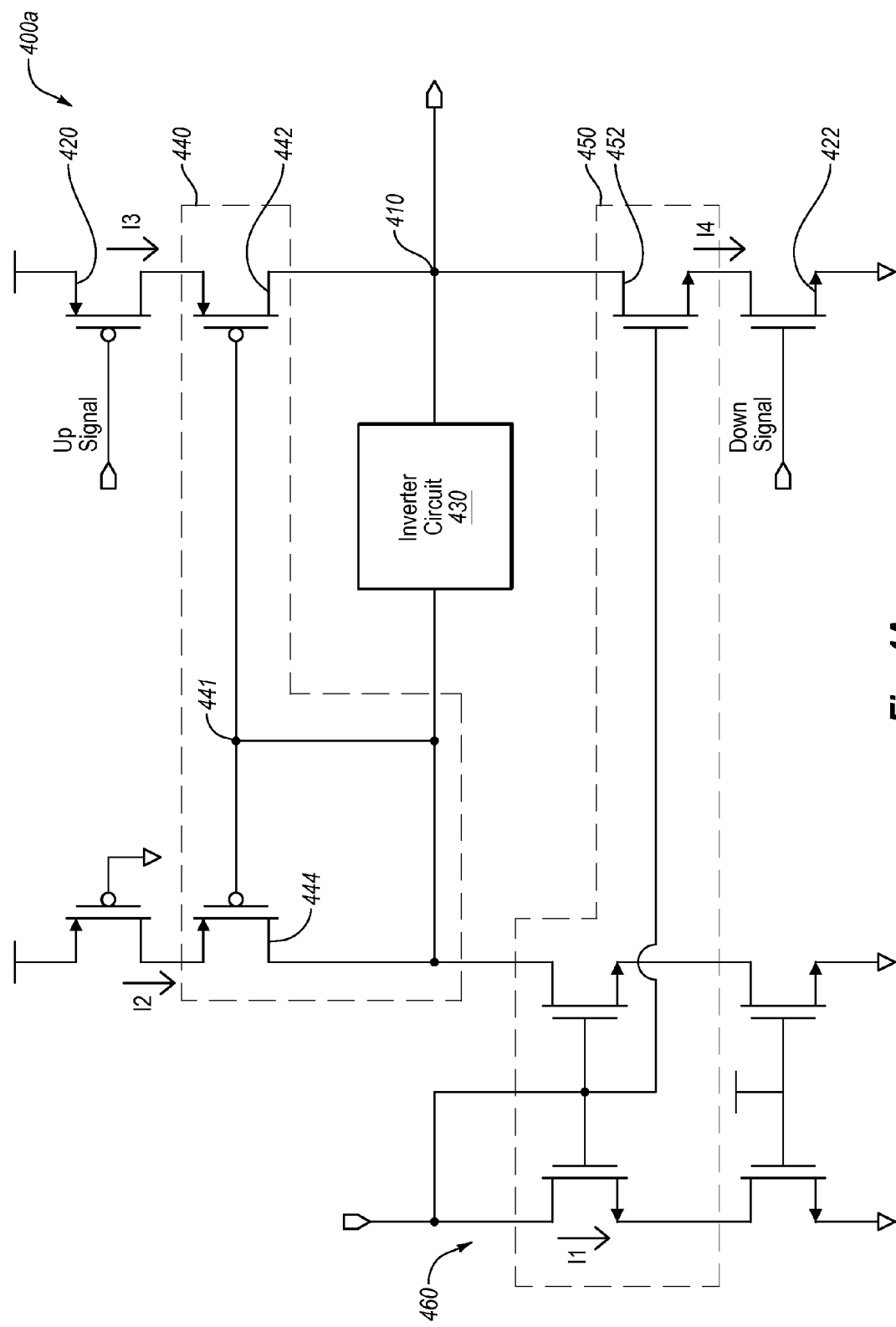
FIG. 4a is a diagram of another example charge pump circuit.

FIG. 4a is a diagram of an example charge pump circuit 400a ("the circuit 400a"), arranged in accordance with at least one embodiment described herein. The circuit 400a may include an output node 410, a first switch transistor 420, a second switch transistor 422, an inverter circuit 430, a current source circuit 440, a current sink circuit 450, and a current supply circuit 460. In some embodiments, the circuit 400a may be an example transistor level configuration of the circuit diagram illustrated in FIG. 2b.

The circuit 400a includes various transistors. Each of the transistors may include a gate terminal, a source terminal, and a drain terminal. As illustrated in FIG. 4a, the source terminal may be the terminal with the arrow, the gate terminal may be the terminal with the parallel horizontal lines, and the drain terminal may be the other terminal.

The current source circuit 440 may include source transistors 442 and 444 and may be configured to source current I3 to the output node 410. The current sink circuit 450 may include a sink transistor 452 and may be configured to sink current I4 from the output node 410.

The first and second switch transistors 420 and 422 may be configured analogous to the first and second switch transistors 320 and 322 of FIG. 3. Thus, no further description is provided for the first and second switch transistors 420 and 422 with respect to FIG. 4.

The inverter circuit 430 may be coupled to the output node 410 and to a node 441. The inverter circuit 430 may invert a voltage on the output node 410 and output the inverted voltage on the node 441. For example, the voltage on the node 441 may be an inversion of the voltage on the output node 410 with respect to a medium voltage level of the output node 410. For example, with a medium voltage level of 0.5 volt, 1.0 volt on the output node 410 may be 0.0 volt on the node 441.

The current source circuit 440 may be configured to source a current I3 to the output node 410. The current I3 may be based on a current I1 from the current supply circuit 406 and a current adjustment by the inverter circuit 430. For example, the current supply circuit 460 may be supplied the current I1. The current supply circuit 460 may be configured such that a current mirror exists between the current supply circuit 460 and the current source circuit 440. Thus, without changes in voltages caused by the inverter circuit 430, a current I2 that passes through the source transistor 444 may be equal or proportional to the current I1 supplied to the current supply circuit 460.

The source transistor 444 and the source transistor 442 may also be configured in a current mirror configuration. As a result, the current I3 that is sourced to the output node 310 may be equal or proportional to the current I2. Thus, without changes in voltages caused by the inverter circuit 430, the current I1 and the current I3 may be equal or proportional assuming infinite output impedance of the current source circuit 440.

When the inverter circuit 430 does adjust the voltage on the node 441, the voltage on the node 441 adjusts an amount of the current I2 that the source transistor 444 conducts. Because of the current mirror between the source transistor 444 and the source transistor 442, the voltage on the node 441 may also adjust an amount of the current I3 that is sourced to the output node 410. In this manner, the inverter circuit 430 may adjust the current sourced to the output node 410 by the current source circuit 440.

The current sink circuit 450 may be configured to sink current I4 from the output node 410. The current I4 may be based on the current I1 supplied to the current supply circuit 460. For example, the current supply circuit 460 may be configured such that a current mirror exists between the current supply circuit 460 and the current sink circuit 450. Thus, the current I4 that passes through the sink transistor 452 may be equal or proportional to the current I1 supplied to the current supply circuit 460.

A brief description of the operation of the circuit 400a follows. When the voltage on the output node 410 is high, the inverter circuit 430 may decrease a voltage on the node 441. A decrease in the voltage on the node 441 may increase the current I3. Increasing the current I3 may help to match an increase in the current I4 due to the finite output impedance of the current sink circuit 450 when the voltage on the output node 410 is high.

When the voltage on the output node 410 is low, the inverter circuit 430 may increase a voltage on the node 441. An increase in the voltage on the node 441 may decrease the current I3. Decreasing the current I3 may help to compensate for an increase in the current I3 due to finite output impedance of the current source circuit 440.

Modifications, additions, or omissions may be made to the circuit 400a without departing from the scope of the present disclosure. For example, in some embodiments, the circuit 400a may include one or more passive and/or active circuit components. Alternately or additionally, a gain of the inverter circuit 430 may be adjustable or fixed. Alternately or alternatively, the current I1 may be adjusted to adjust the currents sourced to and sunk from the output node 410.

Figure 4B:
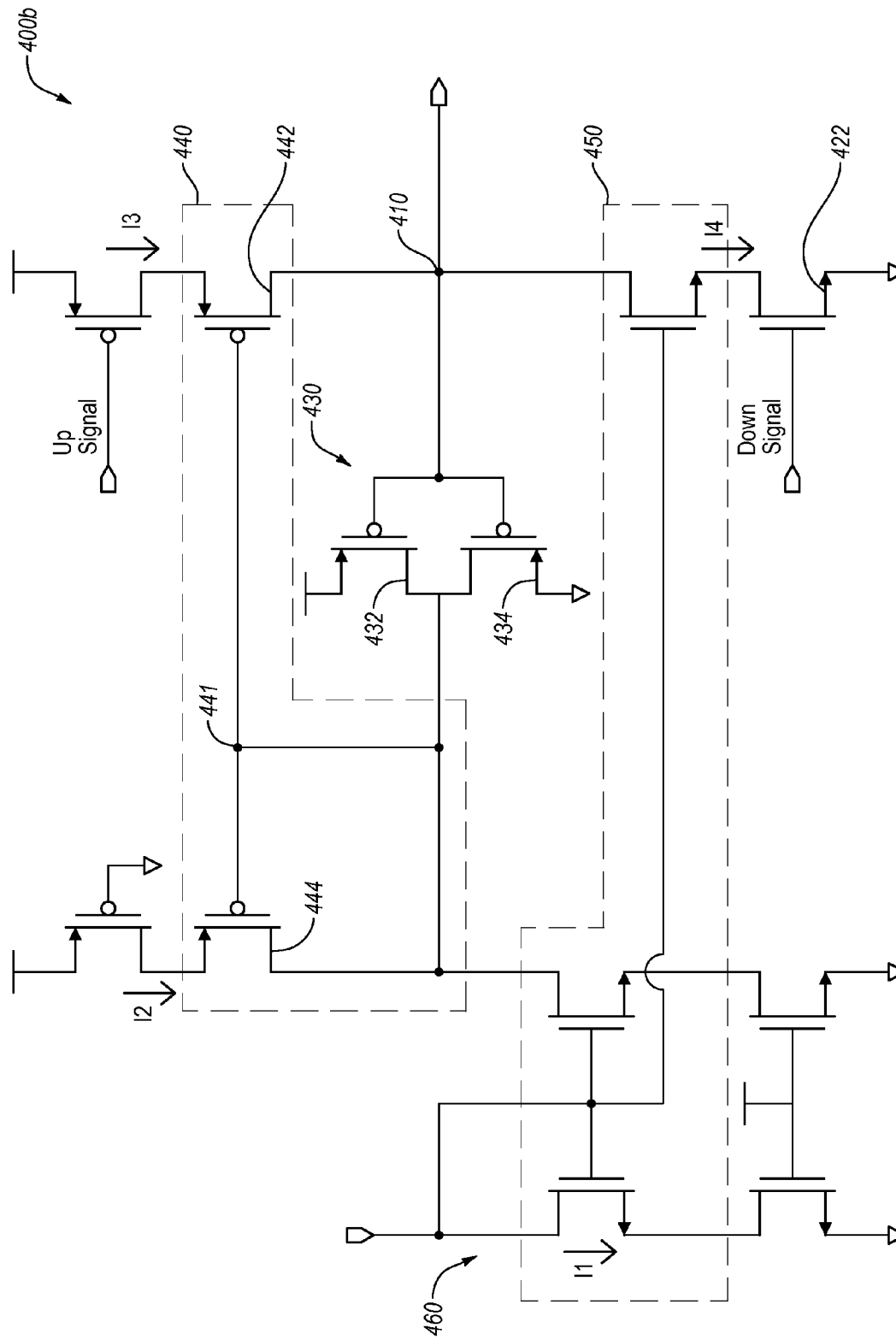
FIG. 4b is a diagram of another example charge pump circuit.

FIG. 4b is a diagram of an example charge pump circuit 400b ("the circuit 400b"), arranged in accordance with at least one embodiment described herein. The circuit 400b may be analogous to the circuit 400a, but may illustrate an example embodiment of the inverter circuit 430. As illustrated in FIG. 4b, the inverter circuit 430 may include first and second amplifier transistors 432 and 434. The gates of the first and second amplifier transistors 432 and 434 may be coupled to the output node 410. The source of the first amplifier transistor 432 may be coupled to a supply voltage and the source of the second amplifier transistor 434 may be coupled to ground. The drains of the first and second amplifier transistors 432 and 434 may be coupled to the node 441. The first and second amplifier transistors 432 and 434 may operate in a manner analogous to the operation of the inverter circuit 430 described with respect to FIG. 4a.

Modifications, additions, or omissions may be made to the circuit 400b without departing from the scope of the present disclosure. For example, in some embodiments, the circuit 400b may include one or more passive and/or active circuit components. Alternately or additionally, the gains of the first and second amplifier transistors 432 and 434 may be adjustable or fixed. Alternately or alternatively, the current I1 may be adjusted to adjust the currents sourced to and sunk from the output node 410.

In FIGS. 3, 4a, and 4b, the illustrated transistors are illustrated as metal-oxide-semiconductor field-effect transistor (MOSFET) transistors. The above description uses the nomenclature gate, source, and drain to represent different terminals of the transistors. The use of the names gate, source, and drain may be used to describe generically the terminals of a MOSFET transistor, or other types of transistors, such as bipolar junction transistors (BJT), junction gate field-effect transistors (JFET), and insulated gate bipolar transistors. Furthermore, in some embodiments, some combination of n-type and p-type transistors may also be used other than that illustrated.

Figure 5:
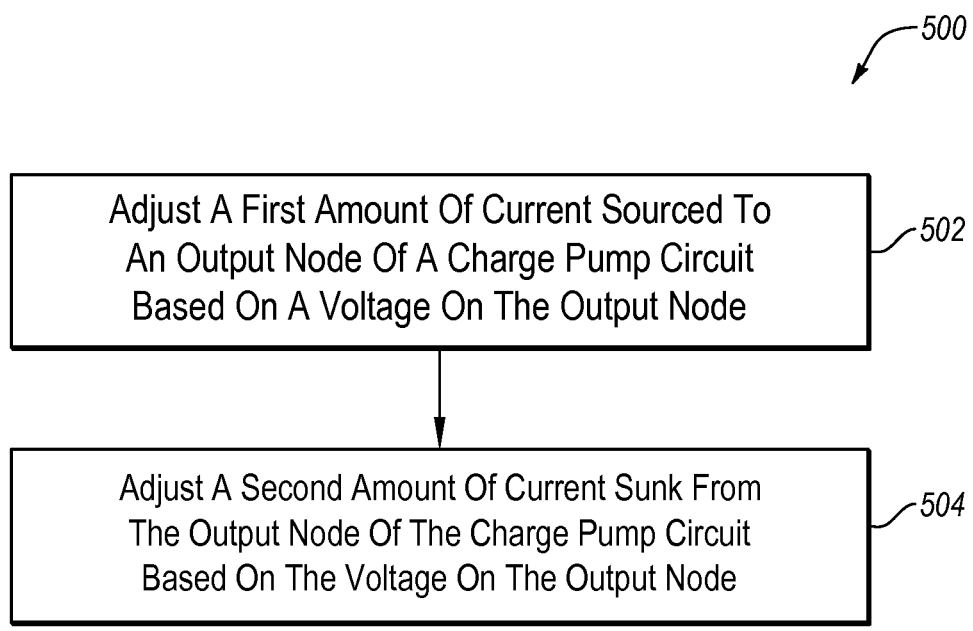
FIG. 5 is a flowchart of an example method of adjusting currents in a charge pump.

FIG. 5 is a flowchart of an example method 500 of adjusting currents in a charge pump, arranged in accordance with at least one embodiment described herein. The method 500 may be implemented, in some embodiments, by a circuit, such as the circuits 200a, 200b, 300, 400a, or 400b of FIGS. 2a, 2b, 3, 4a, and 4b. Although illustrated as discrete blocks, various blocks may be divided into additional blocks, combined into fewer blocks, or eliminated, depending on the desired implementation.

The method 500 may begin at block 502, where a first amount of current sourced to an output node of a charge pump circuit may be adjusted based on a voltage on the output node. In block 504, a second amount of current sunk from the output node of the charge pump circuit may be adjusted based on the voltage on the output node.

In some embodiments, when the voltage on the output node is below a threshold voltage, the first amount of current sourced to the output node may be reduced and the second amount of current sunk from the output node may be increased. Alternately or additionally, when the voltage on the output node is above the threshold voltage, the first amount of current sourced to the output node may be increased and the second amount of current sunk from the output node may be decreased.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 500 may further include directing the adjustment of the first amount of current sourced to the output node by a first amplifier and directing the adjustment of the second amount of current sunk from the output node by a second amplifier.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

All examples and conditional language recited herein are intended as pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A charge pump circuit, comprising:
an output node;
a current source circuit configured to source current to the output node;
a current sink circuit configured to sink current from the output node;
a first amplifier circuit configured to adjust a first amount of current sourced by the current source circuit based on a voltage on the output node, the first amplifier circuit having a first range of operation with respect to the voltage on the output node and the first range of operation of the first amplifier circuit having a limit at ground; and
a second amplifier circuit configured to adjust one of the first amount of current sourced by the current source circuit and a second amount of current sunk by the current sink circuit, the adjusting based on the voltage on the output node, the second amplifier circuit having a second range of operation with respect to the voltage on the output node and the second range of operation of the second amplifier circuit having a limit at a supply voltage of the charge pump circuit, wherein the first and second ranges of operation overlap.

2. The charge pump circuit of claim 1, wherein the second amplifier circuit is configured to only adjust the second amount of current sunk by the current sink circuit based on the voltage on the output node.

3. The charge pump circuit of claim 2, wherein when the voltage on the output node is below a threshold voltage, the first amplifier circuit is configured to reduce the first amount of current sourced by the current source circuit and the second amplifier circuit is configured to increase the second amount of current sunk by the current sink circuit.

4. The charge pump circuit of claim 3, wherein when the voltage on the output node is above the threshold voltage, the second amplifier circuit is configured to reduce the second amount of current sunk by the current sink circuit and the first amplifier circuit is configured to increase the first amount of current sourced by the current source circuit.

5. The charge pump circuit of claim 1, wherein the second amplifier circuit is configured to only adjust the first amount of current sourced by the current source circuit.

6. The charge pump circuit of claim 5, wherein when the voltage on the output node is below a threshold voltage, the first amplifier circuit is configured to reduce the first amount of current sourced by the current source circuit, and when the voltage on the output node is above the threshold voltage, the second amplifier circuit is configured to increase the first amount of current sourced by the current source circuit.

7. The charge pump circuit of claim 1, wherein the first range of operation of the first amplifier circuit is lower than the second range of operation of the second amplifier circuit.

8. The charge pump circuit of claim 1, further comprising:
a first switch circuit configured to selectively electrically couple the current source circuit and the output node; and
a second switch circuit configured to selectively electrically couple the current sink circuit and the output node.

9. A charge pump circuit, comprising:
an output node;
a current input node configured to provide a supply current;
a first current mirror circuit configured to source current to the output node based on the supply current;
a second current mirror circuit configured to sink current from the output node based on the supply current; and
an inverter circuit configured to adjust an amount of current sourced by the first current mirror circuit based on a voltage on the output node, the inverter circuit including:
a first amplifier circuit that has a first range of operation with respect to the voltage on the output node, the first range of operation of the first amplifier circuit having a limit at ground; and
a second amplifier circuit that has a second range of operation with respect to the voltage on the output node, the second range of operation of the second amplifier circuit having a limit at a supply voltage of the charge pump circuit,
wherein the first and second ranges of operation overlap.

10. The charge pump circuit of claim 9, wherein when the voltage on the output node is below a threshold voltage, the inverter circuit is configured to reduce a first amount of current sourced by the first current mirror circuit, and when the voltage on the output node is above the threshold voltage, the inverter circuit is configured to increase the first amount of current sourced by the first current mirror circuit.

11. The charge pump circuit of claim 9, further comprising:
a first switch circuit configured to selectively electrically couple the first current mirror circuit and the output node; and
a second switch circuit configured to selectively electrically couple the second current mirror circuit and the output node.

12. A method, comprising:
adjusting a first amount of current sourced to an output node of a charge pump circuit based on a voltage on the output node, the adjustment of the first amount of current sourced to the output node directed by a first amplifier circuit that has a first range of operation with respect to the voltage on the output node and the first range of operation of the first amplifier circuit has a limit at ground; and adjusting a second amount of current sunk from the output node of the charge pump circuit based on the voltage on the output node, the adjustment of the second amount of current sunk from the output node directed by a second amplifier circuit that has a second range of operation with respect to the voltage on the output node, the second range of operation of the second amplifier circuit has a limit at a supply voltage of the charge pump circuit, and the first and second ranges of operation overlap.

13. The method of claim 12, wherein when the voltage on the output node is below a threshold voltage, the first amount of current sourced to the output node is reduced and the second amount of current sunk from the output node is increased.

14. The method of claim 13, wherein when the voltage on the output node is above the threshold voltage, the first amount of current sourced to the output node is increased and the second amount of current sunk from the output node is decreased.

\* \* \* \* \*